(12) United States Patent
Meagher (10) Patent No.: US 11,514,558 B2
(45) Date of Patent: Nov. 29, 2022

(54) SYSTEMS AND METHODS FOR IMAGE ENHANCEMENT

(71) Applicant: Edward C. Meagher, Greenlawn, NY (US)

(72) Inventor: Edward C. Meagher, Greenlawn, NY (US)

(*) Notice: Subject to any disclaimer, the term of this patent is extended or adjusted under 35 U.S.C. 154(b) by 181 days.

(21) Appl. No.: 16/488,839

(22) PCT Filed: Feb. 2, 2018

(86) PCT No.: PCT/US2018/016691
§ 371 (c)(1),
(2) Date: Aug. 26, 2019

(87) PCT Pub. No.: WO2018/144904
PCT Pub. Date: Aug. 9, 2018

(65) Prior Publication Data
US 2020/0184609 A1 Jun. 11, 2020

Related U.S. Application Data (60) Provisional application No. 62/453,790, filed on Feb. 2, 2017.

(51) Int. Cl.
*G06T 5/00* (2006.01)
*G06T 5/50* (2006.01)
*G06V 40/16* (2022.01)

(52) U.S. Cl.
CPC ............ *G06T 5/005* (2013.01); *G06T 5/50* (2013.01); *G06V 40/172* (2022.01); *G06T 2207/20081* (2013.01); *G06T 2207/30201* (2013.01)

(58) Field of Classification Search
CPC . G06T 5/005; G06T 5/50; G06T 2207/20081; G06T 2207/30201;
(Continued)

(56) References Cited

U.S. PATENT DOCUMENTS 9,396,354 B1 * 7/2016 Murphy ............... H04L 51/212
2003/0028873 A1 2/2003 Lemmons
(Continued)

FOREIGN PATENT DOCUMENTS

EP 1453002 A2 9/2004

OTHER PUBLICATIONS

NPL Search History (Year: 2021).*
(Continued)

*Primary Examiner* — Nancy Bitar
(74) *Attorney, Agent, or Firm* — Carter, Deluca & Farrell LLP (57) ABSTRACT

A method for automatically enhancing an image from a device includes obtaining a first image using an imaging device. Recognition software is configured to recognize an object or individual in the first image. An initial image profile is configured based on the first image. Editing software is used to edit at least one attribute of the initial image profile. At least one subsequent image is taken or received. The recognition software is used to recognize the object or individual in the at least one subsequent image. The at least one attribute of the at least one subsequent image is automatically edited based on the initial image profile.

19 Claims, 3 Drawing Sheets

(58) Field of Classification Search
CPC .............. G06T 11/60; G06K 9/00288; G06K 9/00221; G06K 9/00248; G06K 9/00268; G06K 9/00281; A61B 5/1176
See application file for complete search history.

(56) References Cited

U.S. PATENT DOCUMENTS

| | | | | |
|---|---|---|---|---|
| 2004/0170337 | A1* | 9/2004 | Simon | G06V 40/162 382/254 |
| 2006/0228040 | A1* | 10/2006 | Simon | G06T 5/005 382/254 |
| 2009/0070206 | A1* | 3/2009 | Sengamedu | G06F 16/9558 705/7.36 |
| 2010/0085363 | A1* | 4/2010 | Smith | H04N 5/262 345/473 |
| 2014/0133695 | A1* | 5/2014 | Lienhart | G06Q 30/0241 382/100 |
| 2014/0241592 | A1* | 8/2014 | Yang | G06T 5/001 382/118 |
| 2015/0220777 | A1* | 8/2015 | Kauffmann | G06V 40/10 382/103 |
| 2018/0040110 | A1* | 2/2018 | Deluca | G06V 40/173 |

OTHER PUBLICATIONS

International Preliminary Report on Patentability for application No. PCT/US2018/016691 dated Aug. 6, 2019.
Supplementary European Search Report dated Feb. 8, 2021 issued in corresponding EP Appln. No. 18747387.1.

* cited by examiner

SYSTEMS AND METHODS FOR IMAGE ENHANCEMENT

CROSS-REFERENCE TO RELATED APPLICATION

This application is a National Stage Application of International Application No. PCT/US2018/016691, filed on 2 Feb. 2018, which claims priority to, and the benefit of U.S. Provisional Patent Application No. 62/453,790, filed on Feb. 2, 2017, the entire contents of which are hereby incorporated by reference herein.

BACKGROUND

Every day, millions of people worldwide capture, store, and share digital images with one another. Many of these images show at least a portion of a person, such as their face. For a variety of reasons, the person may wish to have the image of their face enhanced. For instance, the person may wish to have the image of his/her face enhanced to remove a blemish, beauty mark, tattoo or other non-desirable feature. In view of the foregoing, the present disclosure relates to systems and methods for image enhancement, image alteration and/or otherwise image modification.

SUMMARY

In accordance with an aspect of the present disclosure, a method for automatically enhancing an image from a device is described. The method includes obtaining a first image using an imaging device. Recognition software is utilized to recognize an object or individual in the first image. An initial image profile is configured based on the first image. Editing software is used to edit at least one attribute of the initial image profile. At least one subsequent image is taken or received. The recognition software is utilized to recognize the object or individual in the at least one subsequent image. The at least one attribute of the at least one subsequent image is automatically edited based on the initial image profile.

In another aspect of the present disclosure, the at least one attribute is selected from the group consisting of facial jewelry, tattoos, scars, acne, wrinkles, hair, piercings, facial features, body features, and hairstyle.

In yet another aspect of the present disclosure, the at least one attribute is eliminated from the at least one subsequent image.

In still another aspect herein, the at least one attribute is added or otherwise modified to the at least one subsequent image.

In another aspect, the recognition software recognizes an individual and the editing software creates a personal user profile.

In still a further aspect, the personal user profile is saved on the imaging device.

In a further aspect of the present disclosure, the personal user profile is transferrable to another device selected from the group consisting of imaging devices, computers, servers, smart phones, tablets, and gaming systems.

In yet another aspect, the subsequent images are received from another imaging device.

In another aspect of the present disclosure, the subsequent images are automatically edited and the edited images are transferred to a different imaging device.

In yet another aspect of the present disclosure, the subsequent images are received from another imaging device, automatically edited and the edited images are transferred to a different imaging device.

In still another aspect herein, the initial image profile is selectively editable using the editing software to create a subsequent image profile that is selectively transferrable to another imaging device.

In another aspect, the initial image profile or a subsequent image profile is transferrable to a different imaging device.

In still a further aspect, the different imaging device receives the subsequent image profile and uses recognition software to recognize the object or individual in at least one subsequent image and the different imaging device automatically edits the at least one attribute of the at least one subsequent image based on the received subsequent image profile.

In a further aspect of the present disclosure, the initial image profile or a subsequent image profile is transferrable to a server.

In yet another aspect, the server receives the subsequent image profile and uses recognition software to recognize the object or individual in at least one subsequent image and the server automatically edits the at least one attribute of the at least one subsequent image based on the received subsequent image profile.

In another aspect of the present disclosure, the server transfers the edited at least one subsequent image to an imaging device.

In accordance with another aspect of the present disclosure, a method for automatically enhancing an image from a device is described. The method includes configuring recognition software to recognize an object or individual in an image. An image profile is configured based on the image. Editing software is used to edit at least one attribute of the image profile. At least one subsequent image is received. The recognition software is used to recognize the object or individual in the at least one subsequent image. The at least one attribute of the at least one subsequent image is automatically edited based on the image profile.

In accordance with another aspect of the present disclosure, a method for automatically enhancing an image from a device is described. The method includes configuring recognition software to recognize an object in an image. An image profile is configured to identify selectively configurable attributes of the image. Instructions relating to the selectively configurable attributes of the image are received from a server. Editing software is used to edit the selectively configurable attributes of the image based on the received instructions to create a different image. The different image is transferred to an imaging device.

In another aspect of the present disclosure, the selectively configurable attributes are selected from a group consisting of advertising indicia, trademarks, logos, tattoos, piercings, clothing, facial features, and body features.

In accordance with another aspect of the present disclosure, a method for automatically enhancing an image from a device is described. The method includes configuring recognition software to recognize a person in an image. An image profile is configured to identify selectively configurable attributes of the person. Instructions relating to the selectively configurable attributes are received from a server. Editing software is used to edit the selectively configurable attributes based on the received instructions to create a different image. The different image is transferred to an imaging device.

In accordance with another aspect of the present disclosure, a method for automatically enhancing an image from a device is described. The method includes recognizing, using recognition software, an advertisement in an image. An enhancement profile associated with the image is retrieved. The enhancement profile indicates at least one modification to be made to the image. The advertisement in the image is modified based on the enhancement profile.

In another aspect of the present disclosure, modifications to the enhancement profile can be updated continually, daily, or weekly such that the advertisement in the image can be modified based upon advertiser, advertisee or server provider preference.

In yet another aspect of the present disclosure, the advertisement is presented on a billboard or marquee included in the image.

In still another aspect herein, the modifying the advertisement in the image is performed repeatedly based on at least one of an elapsed amount of time since a prior modification of the image or an instance of the image being accessed via a computing device.

In another aspect, the advertisement includes a logo and the modifying the advertisement in the image includes enhancing the logo.

In still a further aspect, the recognizing, retrieving, and modifying are performed automatically as the image is communicated via a server.

In accordance with another aspect of the present disclosure, a method for automatically enhancing an image from a device is described. The method includes recognizing, using recognition software, a person in an image. An enhancement profile associated with the image is retrieved. The enhancement profile indicates at least one modification to be made to the image. The image is modified to make the at least one modification indicated in the enhancement profile. The person is a spokesperson for a brand and the at least one modification includes adding to the image an advertisement or logo for the brand.

In a further aspect of the present disclosure, the method further comprises storing a table that associates sponsors with brands, respectively, and matching the recognized person with one or more associated brands based on the table.

In yet another aspect, the recognizing, retrieving, and modifying are performed automatically as the image is communicated via a server.

BRIEF DESCRIPTION OF THE DRAWINGS

Various aspects and features of the present systems and methods for image enhancement are described herein below with references to the drawings, wherein.

DETAILED DESCRIPTION

The present disclosure is directed to systems and methods for image enhancement and/or image modification. In one aspect, the systems and methods of the present disclosure enable a user to generate a personal enhancement profile (sometimes referred to herein as a Phanity™ profile), store the personal enhancement profile on his/her own device (such as a smartphone), a friend's device, a cloud storage platform, a social media platform (such as Instagram®, Facebook®, Twitter®, Snapchat®, or the like), and enable the personal enhancement profile to automatically enhance or modify one or more photographs taken from the user's device, friend's device or any other device sending or receiving photographs directly or through a server.

Figure 1:
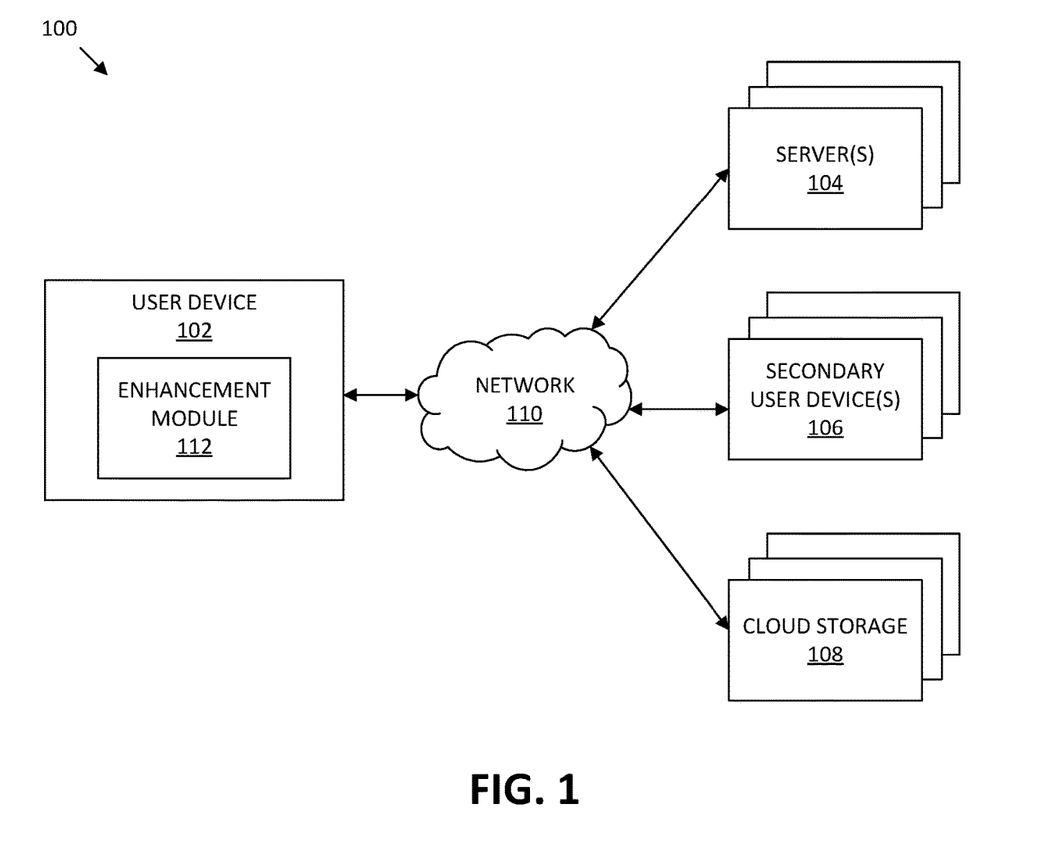
FIG. 1 is a schematic diagram of an illustrative system for image enhancement, in accordance with an embodiment of the present disclosure.

FIG. 1 is a schematic diagram of an illustrative system 100 for image enhancement or modification, in accordance with an embodiment of the present disclosure. When used here herein the term "enhancement" includes modification, deletion, augmentation of a photograph. The system 100 includes one or more user devices 102, servers 104, secondary user devices 106, and cloud storages 108, and a communication network 110 that communicatively couples the user devices 102 to the servers 104, secondary user devices 106, and/or cloud storages 108. The user device 102 may be a smartphone, tablet, personal computer, or any other type of personal computing device. In some embodiments, the user device includes an image capturing device, such as a digital camera (not shown in FIG. 1), configured to capture images, such as images of the user.

The user device 102 includes an enhancement module 112, which in one embodiment, is an application that, when executed on the user device 102, generates a user interface via which a user may configure a personal enhancement profile and utilize the personal enhancement profile to enhance one or more images of the user, store the enhanced image(s) on the user device 102, and/or communicate the enhanced images to the server(s) 104, secondary user device(s) 106, cloud storage(s) 108, and/or another destination (not shown in FIG. 1). Details regarding an example method 300 that for enhancing images by utilizing the system 100 are provided below in connection with FIG. 3. Although FIG. 1 depicts the enhancement module 112 as being included in the user device 102, in various embodiments, the enhancement module 112 may be additionally or alternatively be included in one or more of the servers 104, secondary user devices 106, and/or cloud storages 108, and/or may be part of a standalone server (not separately shown in FIG. 1) coupled to the network 110 to enhance images streaming through the network 110. Additionally, in various embodiments, certain aspects of the enhancement module 112 may be enabled or disabled depending upon the amount of available computing power of each user device 102, server 104 (e.g., a server that handles the moving traffic of pictures from Instagram®, Facebook®, Twitter®, Snapchat®, and/or the like).

Although additional aspects of the enhancement module 112 are described below in connection with FIG. 3, the following is a brief summary of various aspects of the enhancement module 112. The enhancement module 112 is a mobile application (sometimes referred to as an app) or a computer application that is downloadable and performs one or more of the following features: (1) sets up a user's personal enhancement profile; (2) queues the user to take a picture or series of pictures and performs a facial recognition algorithm based on various attributes, points of references of a person's face, facial geometries, spatial face relationships (e.g., distances from nose to ear, mouth to ear, and/or the like), which may be implemented by way of a commercially available facial recognition program or algorithm (or as they become available or developed); (3) once the facial algorithm and recognition is completed, the enhancement module 112 assigns a UIN to the person and stores the UIN on the person's user device 102 or sends the UIN to one or more servers 104 (e.g., an Instagram® server, a Facebook® server, and/or the like); (4) the facial recognition software is utilized to identify the person and the enhancement module 112 (either in a standalone manner or combined as part of the facial software) enables the user to make enhancements or deemphasize certain body portions.

In some aspects, each time a picture is taken with the person's user device 102, the UIN is sent along with the picture—either before or after the person or persons in the picture are identified and the various attributes are enhanced, deemphasized, or otherwise modified. Again, the enhancement module 112 may perform the enhancements locally (on a person's device 102 or may perform the enhancements on a friend's device 106, i.e., the friend that took the picture) or remotely (as the picture is sent and moves through one or more of the servers 104 (e.g., an Instagram® server, a Facebook® server), and/or the like).

In another example, the enhancement module 112 may provide a selfie mode of capturing images, in which case the captured image may be flagged as very likely including an image of the person who owns the user device 102. This may reduce computing burden placed on the user device 102. The UIN may be flagged to alert the user's device 102 or the server 104 or the friend's device 106 that a "selfie" image was captured to indicate a high likelihood that the user's image is captured in picture, thereby reducing the respective computing burdens placed on those devices as well. Additionally, location services may be enabled on a user's device such that if a photograph is being processed through a server or server farm, location services may be able to reduce the computing power needed help with the facial recognition of a user in a picture. This can be particularly useful with picture of large groups and a large number of people are utilizing a service according to the present disclosure.

In some aspects, raw images (images prior to being enhanced/modified) may also be stored on the user device 102, the friend's device 106, or on the server 104. For instance, the server 104 or local device 102 may store original picture information for retrieval of the original picture prior to any enhancements. In this manner, the user device 102, friend's device 106, and/or server 104 may be configured to reverse enhancements of images of any person or any group of people in any picture.

Figure 2:
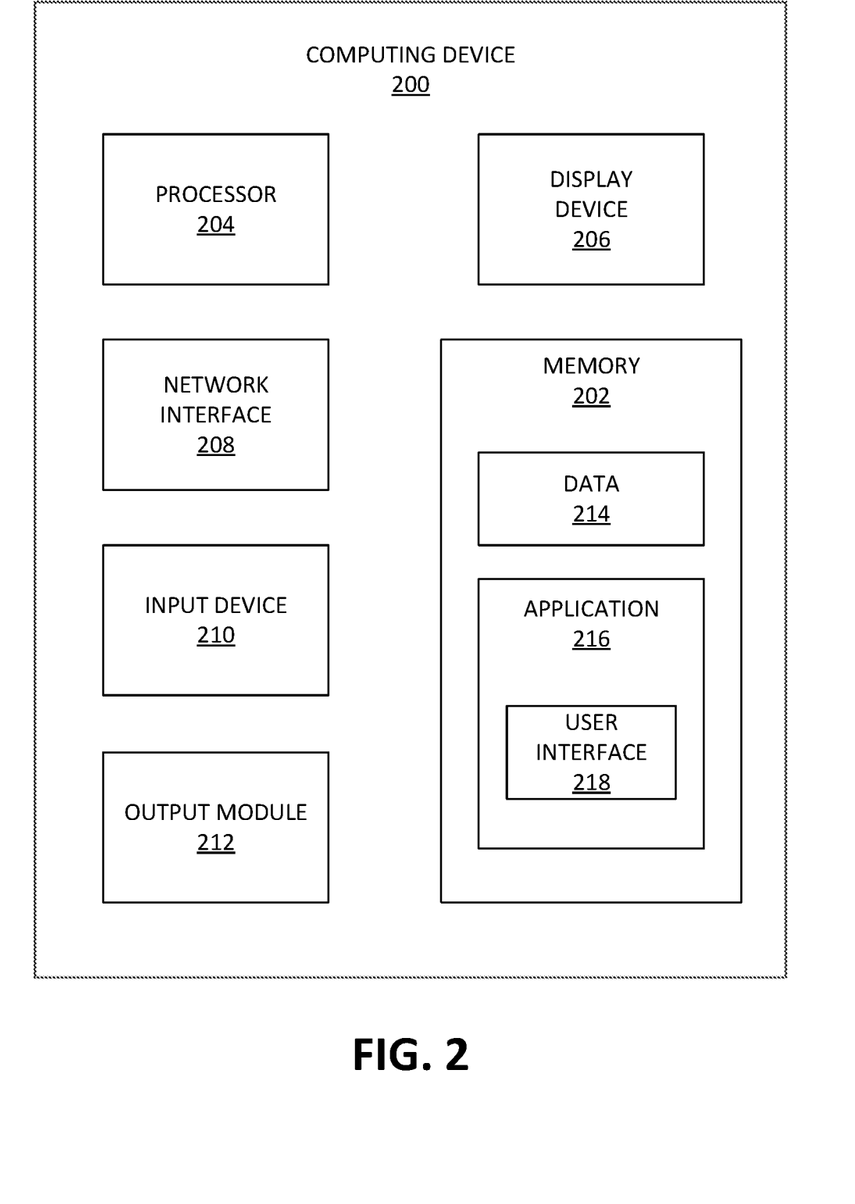
FIG. 2 is a schematic block diagram of an illustrative embodiment of a computing device that may be employed in various embodiments of the present information system, for instance, as part of the system or components of FIG. 1, in accordance with an embodiment of the present disclosure.

FIG. 2 is a schematic block diagram of a computing device 200 that may be employed in accordance with various embodiments herein. Although not explicitly shown in FIG. 1, in some embodiments, the computing device 200, or one or more of the components thereof, may further represent one or more components of the system 100.

The computing device 200 may, in various embodiments, include one or more memories 202, processors 204, display devices 206, network interfaces 208, input devices 210, and/or output modules 212. The memory 202 includes non-transitory computer-readable storage media for storing data and/or software that is executable by the processor 204 and which controls the operation of the computing device 200. In embodiments, the memory 202 may include one or more solid-state storage devices such as flash memory chips. Alternatively, or in addition to the one or more solid-state storage devices, the memory 202 may include one or more mass storage devices connected to the processor 404 through a mass storage controller (not shown in FIG. 2) and a communications bus (not shown in FIG. 2). Although the description of computer readable media contained herein refers to a solid-state storage, it should be appreciated by those skilled in the art that computer-readable storage media can be any available media that can be accessed by the processor 204. That is, computer readable storage media includes non-transitory, volatile and non-volatile, removable and non-removable media implemented in any method or technology for storage of information such as computer-readable instructions, data structures, program modules or other data. Examples of computer-readable storage media include RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed by computing device 200.

In some embodiments, the memory 202 stores data 214 and/or an application 216. In some aspects the application 216 includes a user interface component 218 that, when executed by the processor 204, causes the display device 206 to present a graphical user interface (GUI) (not shown in FIG. 2), such as a GUI of the enhancement module 112 (FIG. 1). The network interface 208, in some embodiments, is configured to couple the computing device 200 and/or individual components thereof to a network, such as a wired network, a wireless network, a local area network (LAN), a wide area network (WAN), a wireless mobile network, a Bluetooth network, the Internet, and/or another type of network. The input device 210 may be any device by means of which a user may interact with the computing device 200. Examples of the input device 210 include without limitation a mouse, a keyboard, a touch screen, a voice interface, and/or the like. The output module 212 may, in various embodiments, include any connectivity port or bus, such as, for example, a parallel port, a serial port, a universal serial bus (USB), or any other similar connectivity port known to those skilled in the art.

Figure 3:
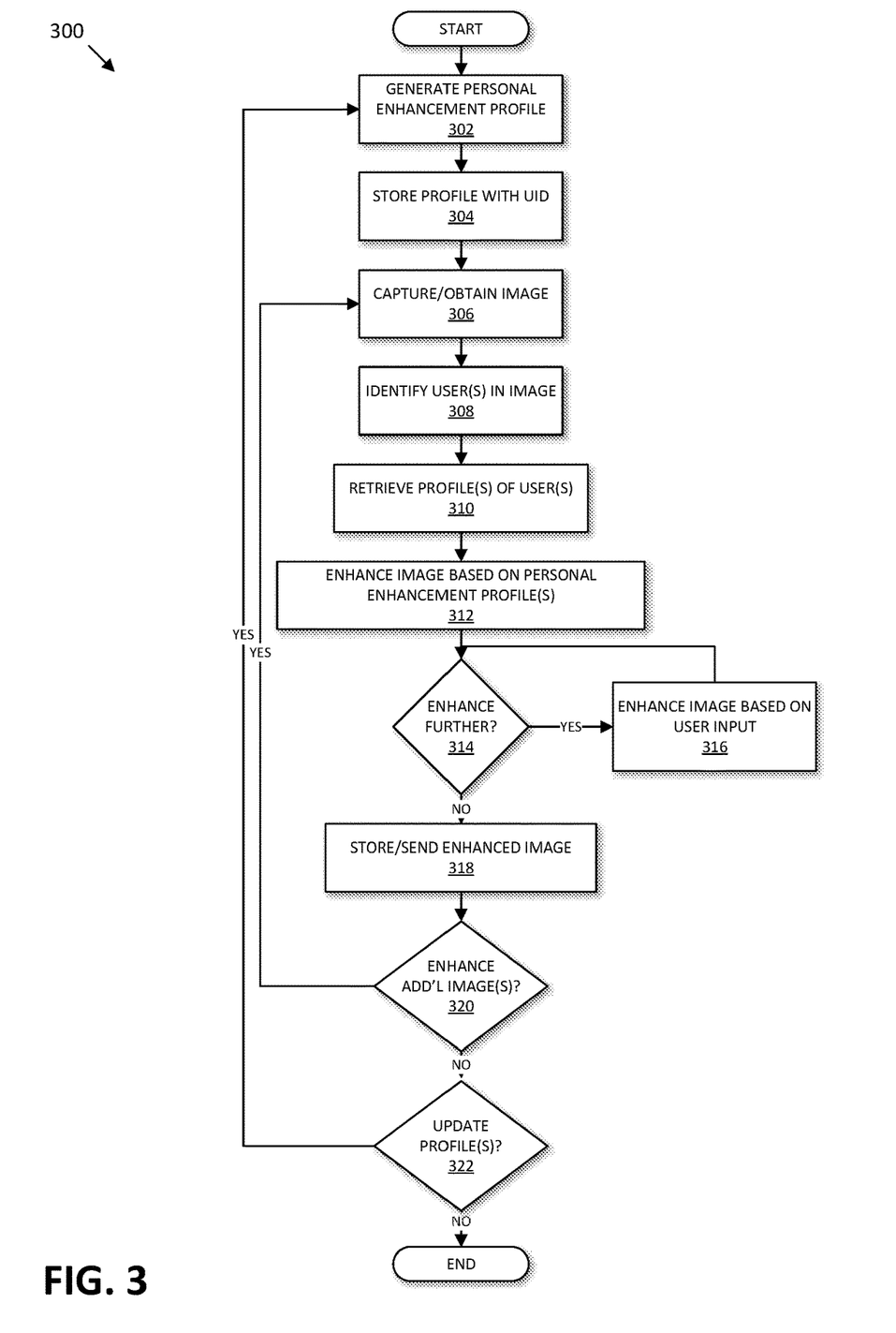
FIG. 3 is a flowchart showing an illustrative method for image enhancement, in accordance with an embodiment of the present disclosure.

FIG. 3 is a flowchart showing an illustrative method 300 for enhancing/modifying one or more images by way of the image enhancement system 100 of FIG. 1, in accordance with an embodiment of the present disclosure. At block 302, a personal enhancement profile is generated by way of a GUI provided by the enhancement module 112 via the user device 102. The personal enhancement profile generally includes information regarding certain types of visual adjustments the user wishes to be made to digital images in which the user appears. Some example types of features that the enhancement module 112 may provide by way of the personal enhancement profile include, without limitation, (1) manipulation features (e.g., zoom, rotate, morph, edit, color, remove, add) to enable the user to make fine adjustments for wrinkles, pimples, scars, baggy eyes, hair color, weight (slenderizing software), de-aging, and/or the like; (2) an automatic feature that makes suggested enhancements or deemphasizes certain areas; (3) removal from every picture of certain types of items, such as piercings, tattoos, earrings, unwanted hair, hair length, and/or the like; (4) addition to every picture of certain types of items, such as hair (bald spots), tattoos, earrings, teeth, wedding ring, and/or the like; (5) ability to customize based on which group of people to which the photograph is being sent (e.g., when sending to parents, removing evidence of tattoos, earrings, piercings, and/or the like, or when posting to social sites, removing or adding features such as tattoos, piercings, hair loss, hair length, wedding rings, scars, pimples, weight, smoking articles, and/or the like. As can be appreciated, some of the modifications relate to features that are individual specific, pimple, scar, etc. while other modifications can relate to features that are time specific, person smoking cigarette or hair length, color or the day. The editing program may differentiate these features between those that are automatically editing for each picture and those that may prompt the user if desired.

Once all enhancement/modifications are made, the enhancements are stored in a user's enhancement profile either locally (own device or user's other devices), friend's device, or on the control server and associated with the user's UIN. Multiple enhancement profiles may be utilized and customized based on where the picture might be going, e.g., parents, work, posting on social media, etc. A person's UIN may include additional criteria or coding to facilitate this purpose. For example, the user may set up his/her UIN to modify all pictures going to parents or work as to be highly modified or "whitewashed" whereas friend X can be identified as only partially modified "whitewashed". As can be appreciated, this enables a user to set up various levels of modification in advance of pictures being sent across the web or between friends and once the user is facially identified the app automatically modifies the image based upon a user's present parameters.

At block 304, the personal enhancement profile is stored in a memory (not separately shown in FIG. 1) of the user device 102, or in another location, such as on the server(s) 104, secondary user device(s) 106, cloud storage(s) 108, and/or the like. In one example, each user's device 102 may store that user's personal enhancement profile. In other examples, a personal enhancement profile of the user and/or a corresponding user identification number (UIN) may be communicated to one or more user devices 106 of the user's friends to enable the enhancement modules 112 of the friend's user device 106 to store the personal enhancement profiles of the user and use it to automatically enhance any images in which the user is identified. In this manner, when the friend takes a picture via his user device 106, the user device 106 has the other user's personal enhancement profile in queue and, through the enhancement module 112 of the user device 106 software (or and facial recognition software working with the enhancement module 112), the user device 106 will recognize the user in any picture taken from the friend's user device 106 and automatically adjust the image of the user based on the user's own personal settings before the image is sent across social networks or to another device to Instagram®, Facebook®, Instagram®, Twitter®, and/or another destination. In some examples, this functionality is limited based upon computing power of each user device 106, such as by limiting the number of friend personal enhancement profiles based on the amount of memory available in the user device 106. Alternatively, the friend may simply store the user's personal enhancement profile with the unique identification number corresponding to the user, and, once the user is recognized by the friend's user device 106, or as the image moves through a control server such as server 104, the user identification number is detected in the image and the server 104 (e.g., Instagram® server, Facebook® server, and/or the like) will make adjustments to the image when the image moves through the server 104 based on uploaded personal settings that were previously stored or uploaded to the server. As can be appreciated, these settings can be modified at any time. Alternatively, the friend's device may simply store the user's UIN and every image sent will have the UINs of all of the user's friends and as the image moves through server (e.g., Instagram® server, Facebook® server, and/or the like), the server 104 identifies the tagged UINs, performs facial recognition of the image and for each user detected in the image, makes the enhancements/modifications based on the corresponding personal enhancement profiles of the various users as the image moves through the server 104.

In yet another embodiment where the personal enhancement profile is stored on a server 104 (e.g., an Instagram® server, a Facebook® server, and/or the like), the server 104 stores the user's UIN and every picture sent via the server 104 will have the UIN as metadata and the server 104 will perform facial recognition and, if the user is detected in the picture, make the enhancements according to the personal enhancement profile as the picture moves through the server 104. In this instance as in above, the various personal enhancement profiles may be modified at any time by the user(s) uploading his/her settings on the server. Groups of UINs may be identified by the server 104 or uploaded from one or more user devices 104 along with all of the UINs from various friends of the group and, as the picture moves through control server (e.g., an Instagram® server, a Facebook® server, and/or the like), the server 104 identifies the tagged UINs, performs facial recognition on the picture, and automatically adjusts the pictures in accordance with the appropriate personal enhancement profiles as the picture moves through the server 104. Again, this functionality may be limited based on available computing power of the server 104, but grouping will reduce computer load. As mentioned elsewhere herein, a friend may have several UINs stored on their user device 102 that are transmitted with every picture, thereby facilitating the facial recognition by the server 104. Other known methods of reducing computer load are also envisioned, e.g., as detailed bellow, location services may be utilized to limit the number of user's being searched at any one time.

In one embodiment, all UINs are stored on the server 104 (e.g., all Instagram® accounts may have respective UINs associated with each account) and so that everyone is facially recognized and the pictures are automatically adjusted as all pictures move through the server 104. Such functionality may require a large amount of computing power, however various algorithms may be employed to reduce computer burden, e.g., grouping (as mentioned above) or geo-location algorithms. For instance, everyone having a "locatable" device (e.g., via a GPS system) that is within a predetermined range of miles (or feet or another unit of distance) of the picture taker's location is mapped and identified as a first query, and these people are identified as an initial group for facial recognition programs, thereby reducing computer burden. As each person is identified, less computing power is needed. "Locatable" device, in this context, refers to a device having a feature that allows the device's location to be used by various programs.

In another aspect, a person taking a picture via the user device 102 may have the ability to tag people for the server 104 (analogous to a feature available in Facebook®) for assisting personal enhancement profiling. As mentioned above, a person's own user device 102 taking a picture can perform facial recognition or have list of friends UINs to assist servers 104 in facial recognition of everyone in the picture. The server 104 may also have the ability to timeout if facial recognition is not working or taking too long. As can be appreciated, various algorithms (such as those mentioned above) may be utilized to reduce this burden.

At block 306, an image (which may also be referred to as a photograph) is captured by way of a digital camera of the user device 102 or another image capturing device, and a digital image file is generated based on the captured image. Alternatively, and/or in addition, the image may have previously been captured and stored and may be obtained at block 306 by retrieval from a memory of the user device 102, the server(s) 104, secondary user device(s) 106, cloud storage(s) 108, and/or the like.

At block 308, the enhancement module 112 identifies the user in the image by any one of a variety of methods. For instance, the enhancement module 112 may identify a face of the user in the image by executing an image recognition algorithm using one or more reference images of the face of the user or one or more reference files including characteristics that may be utilized to identify the face of the user in the image. Alternatively, or in addition, the image may be previously tagged with a user identifier, and at block 308 the enhancement module 112 may identify the user in the image by comparing the user identifier with which the image is tagged to user identifiers included in a stored table of user identifiers. Additionally, although block 308 is described as recognizing a single user, in various embodiments enhancement module 112 may identify multiple users in the image at block 308. For instance, the enhancement module 112 may be configured to facially recognize the user or owner of the user device 102 and/or friends of the user in pictures captured and/or stored on the user device 102 and may queue the user's personal enhancement profile to automatically adjust the picture according to the user's personal enhancement profile before sending the picture to a destination from the user device 102. Additionally, the identification at block 308 may be performed using facial recognition software, which may be local to the user device 102, located on a friend's device (e.g., secondary user device 106), and/or on one or more control servers (e.g., servers 104). The facial recognition software may be third party software working with the enhancement module 112 or as part of the enhancement module 112 itself.

At block 310, for each of the users identified in the image at block 308, the enhancement module 112 retrieves from a storage (e.g., a memory (not separately shown in FIG. 1) of the user device 102) the respective personal enhancement profile(s) stored at block 304.

At block 312, the enhancement module 112 enhances the image based on the personal enhancement profiles retrieved at block 310. In this manner, once a person is recognized in the image, the enhancement module 112 uses that person's personal enhancement profile to enhance the face (or other portion) of that person in the image according to that user's preferences. As explained elsewhere herein, a unique UIN may be assigned to each user and utilized to facilitate this purpose. Example types of enhancements that may be made at block 312 are described above. Once the enhancement module 112 recognizes the user (block 308), the image may be automatically adjusted locally (on the user device 102 before it is sent), on another user device 106 (e.g., a friend's device) before the friend sends the image, or on one or more of the servers 104 as the image moves through the server 104. At this point the image may be sent to another device or through a social media platform if desired or if the user opts for this level of automation. If the use desires more control over the images, the user may opt for one or more further algorithm features as explained below.

At block 314, a determination is made as to whether any additional enhancements to the image are to be made. In some examples, the enhancement module 112 makes this determination by presenting an inquiry to the user via a GUI of via the user device 102 and receiving user input via the GUI. In this manner, the determination at block 314 may afford the user the opportunity to further enhance the image before storing or sending the image. Alternatively, and/or in addition, the determination at block 314 may be made to confirm or adjust the image again if too many enhancements or not enough enhancements have been made, prior to sending the image to a destination.

If it is determined at block 314 that additional enhancement to the image is to be made ("YES" at block 314, then control passes to block 316. At block 316, the enhancement module 112 enhances the image based on the user input provided via the GUI of the user device 102. Control then passes back to block 314 to determine whether any additional enhancements to the image are to be made. In this manner, the enhancement module 112 may enable the user to manually enhance a photograph on the user device 102 prior to sending the photograph to a destination.

If it is determined at block 314 that no additional enhancement to the image is to be made ("NO" at block 314, then control passes to block 318. At block 318, the enhancement module 112 stores the enhanced image (the image enhanced at block 312 and/or block 316) in a storage (e.g., a memory of the user device 102 or in another storage) and/or communicates the enhanced image to one or more of the servers 104, secondary devices 106 and/or cloud storages 108 via the network 110. In this manner, the system 100 enables the user to custom tailor an enhancement profile that automatically adjusts a photograph before it is sent, adjusts a photograph on its way to a recipient (as it moves through a control server 104, for instance), or when it is received by a recipient utilizing the user's own user-created personal enhancement profile to reduce/add or otherwise modify, for example, noticeable hair loss, pimples, wrinkles, weight, teeth, hair color, teeth color, tattoos, scars, earrings, piercings, and/or the like.

At block 320, a determination is made as to whether any additional images are to be enhanced. In some examples, the enhancement module 112 makes this determination by presenting an inquiry to the user via a GUI of via the user device 102 and receiving user input via the GUI. In this manner, the determination at block 320 may afford the user the opportunity to enhance further images. If it is determined at block 320 that an additional image is to be enhanced ("YES" at block 320, then control passes to block 306 to capture or obtain an image in the manner described above. If it is determined at block 320 that no additional images are to be enhanced ("NO" at block 320, then control passes to block 322.

At block 322, a determination is made as to whether any personal enhancement profiles are to be updated. In some examples, the enhancement module 112 makes this determination by presenting an inquiry to the user via a GUI of via the user device 102 and receiving user input via the GUI. In this manner, the determination at block 322 may afford the user the opportunity to update their personal enhancement profile, for instance, based on any additional enhancements that were made at block 316. If it is determined at block 322 that a personal enhancement profile is to be updated ("YES" at block 322, then control passes to block 302 to update the personal enhancement profile that was previously generated during a prior iteration of block 302 in the manner described above. Thus, the user can sample pictures and tweak their enhancement profile as needed, and can easily adjust any enhancements as necessary or as often as the user likes. If it is determined at block 322 that no personal enhancement profile is to be updated ("NO" at block 322, then the method 300 terminates.

Having described an example method for image enhancements in the context of enhancing facial images of users, some additional example aspects of the system 100 are now described. In general, alternative embodiments may involve automatically detecting certain aspects of an image and automatically modifying the image based on one or more rules or settings, which may be configured by a user via the enhancement module 112 of the user device 102. In one embodiment, the system 100 is configured to implement one or more advertising-related features. For example, the system 100 may enable an advertiser to change billboard ads or ads on buildings shown in the background of a captured image from any image being processed through a server or across a social media site e.g., Instagram® server, Facebook® server, and/or the like. For example, as a personal image is taken and being processed across a social medial server or across a social media site, various elements in the image background may be identified, e.g., the famous billboard at New York—Times Square. These elements may be automatically identified (akin to facial recognition) and these images may be flagged for modification. For example, the owner of the billboard at Times Square may choose to display a newer or different image on the billboard each time the same picture passes through the social media server, or the owner may opt to rotate advertisements as the same or any image passes through the various servers. In this instance, the server farms may be able to create revenue by tracking these type of features (billboards, marquees, etc.) and the owners of the billboards, marquees and they like can generate additional review from each billboard long past the initial image being taken and the advertisee can upload new images of new products or display a marquee or new ad at any time for future display of future products long past the image being taken. As each image pass across the social network server, the new background image, marquee, trademark, ghost image is displayed.

In this manner, a person who owns a billboard can keep selling ad space each time a picture comes across. In another aspect, the system 100 can enable an advertiser to control and change a particular ad based on the time (or season, and/or the like) the image is displayed, such as displaying income tax-related ads during the season in which income taxes are due.

There may also be a counter linked to the picture (e.g., by way of metadata) that limits the number of changes for a single picture, or permits the picture to be enhanced an unlimited number of times.

Celebrities may also find the present disclosure useful in thwarting paparazzi or creating additional revenue for his/her services. For example, a celebrity like Ryan Reynolds, may find it useful to be identified in any picture streaming across social medial and being able to control the content or dissemination of any photos. In other words, if he and his family are on vacation and someone takes a lewd picture of him or his family he may be able to subscribe to t service that automatically identifies him (and/or his family) and he is either notified or is able to create an automatic response to the image such as blocking out his face, the face of his kids, or simply placing a black marquee across the image with some sort of nice privacy statement.

On the other hand, other celebrities might want the publicity and encourage picture being taken of them. In this instance, these celebrities may want to capitalize on his/her image. For example, each time Beyonce's picture is taken, she is facially recognized and identified. In this instance, if she is representing Coach® bags, every time she is recognized in an image passing through the server, a coach logo is automatically added to the image in some fashion. A marquee or ghost image may also be utilized for this purpose. In this instance, the celebrity, the advertiser and the server provider (social network provider) all reap revenue for every image. Moreover, celebrities may opt to have a tattoo or piecing automatically added to each image in accordance with the other aspects of this disclosure described above. Fake tattoos that are automatically added to each image are another source of celebrity revenue.

Obviously, the server site may have to revise its end user agreements to reflect this change with users but in theory the owner of any famous background image may utilize the concepts described herein for this purpose.

Additionally, a forwarded picture can have a counter associated therewith (again using metadata, for instance) to keep track of how many times an image is shared, and optionally notify an originator of the image when the image goes viral. This notification that the image is going viral may enable the owner or advertiser to afford them an opportunity to update or change the image as needed. A counter can also be used to automatically track the number of times an ad is changed or forwarded to obtain metrics for future sales on advertising medium (e.g., billboard).

In a further embodiment, the system 100 may be configured to automatically identify in an image, and enhance, an advertising logo in a manner similar to that described above for identifying and enhancing a facial image. For instance, the system 100 may be configured such that, if there is a logo or trademark in a picture, the trademark is automatically identified and it is enhanced or made clearer on a shirt, hat, and/or the like. As mentioned above, the system 100 may also enable a person to authorize the embedment of advertisements in their pictures. For example, a celebrity sponsor can automatically have certain logos embedded into images of them that are communicated via the network 110. A storeowner can have one of their store signs automatically embedded as a background in his pictures.

The system 100 may also be configured to automatically identify in an image, a billboard or storefront and load a new ad on the billboard or storefront. In this manner, the system 100 may enable an advertiser to change billboard ads or ads on buildings shown in the background of an image automatically and whenever they wish as the image passes through a farm of the servers 104. The system 100 may further automatically identify in an image a person who is a celebrity or spokesperson for a product or service and then add to the image a banner or other advertisement for that product or service. An advertiser may also have one of its billboards identified in picture or by a specific location (e.g., like the billboard located in times square in New York City) and the owner can provide a different ad (or an ad can be placed or uploaded) each time the picture passes across a server 104 (e.g., a Google® server). Thus, for each photo from anyone that passes across the server 104, the billboard is identified, and the owner of the billboard can embed a different ad within each instance of the person's picture. Further, when a picture is presented, for instance, on Facebook®, Google®, a quick link may be automatically added to the bottom of the picture for a fee. In other words, a clothing storeowner may be automatically recognized in a photo, and an authorization can be provided (automatically or manually) for a quick link (or banner) to be added to the bottom of such photos. Additionally, trademarks or logos or clothing items may be automatically recognized in a picture and may be selectable (e.g., via a tap on a touchscreen of the user device 102) to enable someone to navigate to the website of that store.

In some embodiments as mentioned above, the system 100 is configured to add to an image certain features, such as facial features, body features, features of clothing, and/or arm tattoos. For instance, the system 100 may add logos to clothing items shown in an image in a case where the clothing item is recognized and the person wearing the clothing item is a celebrity sponsor. For example, a celebrity sponsor may be recognized and a clothing item recognized as well and the celebrity sponsor and/or the brand of the clothing item may configure the system 100 to automatically change the outfit, enhance the logo or place a banner or an additional ad in the image as needed. This functionality may be configured to be fully automatic and may include the ability to upload and change the image repeatedly and periodically based on time through server (e.g., on a minute, hourly, daily or yearly basis). The system 100 may further have the ability to add features, such as mustache, make fatter, tattoos, facial hair, and/or the like, for anonymity, a celebrity who may have been caught in an image. The system 100 may also be configured to eliminate facial hair, tattoos, earrings, pimples, scars, and/or the like, based on user device 102, friend's user device 106, and/or server 104 having that user's personal enhancement profile stored.

The embodiments disclosed herein are examples of the present systems, methods, and computer-readable media and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present information systems in virtually any appropriately detailed structure. Like reference numerals may refer to similar or identical elements throughout the description of the figures.

The phrases "in an embodiment," "in embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

The systems and/or methods described herein may utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms. In example embodiments that employ a combination of multiple controllers and/or multiple memories, each function of the systems and/or methods described herein can be allocated to and executed by any combination of the controllers and memories.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Any of the herein described methods, programs, algorithms or codes may be contained on one or more non-transitory computer-readable or machine-readable media or memory. The term "memory" may include a mechanism that provides (in an example, stores and/or transmits) information in a form readable by a machine such a processor, computer, or a digital processing device. For example, a memory may include a read only memory (ROM), random access memory (RAM), magnetic disk storage media, optical storage media, flash memory devices, or any other volatile or non-volatile memory storage device. Code or instructions contained thereon can be represented by carrier wave signals, infrared signals, digital signals, and by other like signals.

The foregoing description is only illustrative of the present information systems. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A method for automatically enhancing an image from a device, comprising:
   obtaining a first image using an imaging device;
   configuring recognition software to recognize an object or individual in the first image;
   configuring an initial image profile based on the first image, wherein the initial image profile includes a plurality of levels of modification;
   associating a user identification number with the object or the individual in the first image;
   using editing software to edit at least one attribute of the initial image profile;
   taking or receiving at least one subsequent image;
   in advance of the subsequent image being at least one of stored or transmitted, using the recognition software to recognize the object or individual in the at least one subsequent image;
   determine a level of modification of a plurality of levels of modification based on the user identification number;
   automatically editing the at least one attribute of the at least one subsequent image based on the edited at least one attribute of the initial image profile and the determined level of modification;

updating the initial image profile based on the editing of the at least one attribute of the at least one subsequent image; and at least one of storing or transmitting the edited subsequent image.

2. The method for automatically enhancing an image from a device of claim 1, wherein the at least one attribute is selected from the group consisting of facial jewelry, tattoos, scars, acne, wrinkles, hair, piercings, facial features, body features, and hairstyle.

3. The method for automatically enhancing an image from a device of claim 1, wherein the at least one attribute is eliminated from the at least one subsequent image.

4. The method for automatically enhancing an image from a device of claim 1, wherein the at least one attribute is added to the at least one subsequent image.

5. The method for automatically enhancing an image from a device of claim 1, wherein the recognition software recognizes an individual and the editing software creates a personal user profile.

6. The method for automatically enhancing an image from a device of claim 5, wherein the personal user profile is saved on the imaging device.

7. The method for automatically enhancing an image from a device of claim 5, wherein the personal user profile is transferrable to another device selected from the group consisting of imaging devices, computers, servers, smart phones, tablets, and gaming systems.

8. The method for automatically enhancing an image from a device of claim 1, wherein the subsequent images are received from another imaging device.

9. The method for automatically enhancing an image from a device of claim 1, wherein the subsequent images are automatically edited and the edited images are transferred to a different imaging device.

10. The method for automatically enhancing an image from a device of claim 1, wherein the subsequent images are received from another imaging device, automatically edited and the edited images are transferred to a different imaging device.

11. The method for automatically enhancing an image from a device of claim 1, wherein the initial image profile is selectively editable using the editing software to create a subsequent image profile that is selectively transferrable to another imaging device.

12. The method for automatically enhancing an image from a device of claim 11, wherein the initial image profile or a subsequent image profile is transferrable to a different imaging device.

13. The method for automatically enhancing an image from a device of claim 12, wherein the different imaging device receives the subsequent image profile and uses recognition software to recognize the object or individual in at least one subsequent image and the different imaging device automatically edits the at least one attribute of the at least one subsequent image based on the received subsequent image profile.

14. The method for automatically enhancing an image from a device of claim 11, wherein the initial image profile or a subsequent image profile is transferrable to a server.

15. The method for automatically enhancing an image from a device of claim 14, wherein the server receives the subsequent image profile and uses recognition software to recognize the object or individual in at least one subsequent image and the server automatically edits the at least one attribute of the at least one subsequent image based on the received subsequent image profile.

16. The method for automatically enhancing an image from a device of claim 15, wherein the server transfers the edited at least one subsequent image to an imaging device.

17. A method for automatically enhancing an image from a device, comprising:

recognizing, using recognition software, a person in an image;

associating a user identification number with the person in the image;

retrieving an enhancement profile based on user-configured visual alterations and associated with the image, wherein the enhancement profile indicates at least one modification to be made to the image, wherein the enhancement profile includes a plurality of levels of modification;

determining a level of modification of a plurality of levels of modification based on the user identification number;

modifying the image to make the at least one modification indicated in the enhancement profile, based on the determined level of modification, wherein the person is a spokesperson for a brand and the at least one modification includes adding to the image a logo for the brand; and updating the enhancement profile based on the at least one modification.

18. The method for automatically enhancing an image from a device of claim 17, further comprising:

storing a table that associates sponsors with brands, respectively; and matching the recognized person with one or more associated brands based on the table.

19. The method for automatically enhancing an image from a device of claim 17, wherein the recognizing, retrieving, and modifying are performed automatically as the image is communicated via a server.

* * * * *